US008285622B1

(12) United States Patent  (10) Patent No.: US 8,285,622 B1
Rao et al.  (45) Date of Patent: *Oct. 9, 2012

(54) METHOD AND SYSTEM FOR PROVIDING BUDGETING RECOMMENDATIONS BASED ON FINANCIAL DATA FROM SIMILARLY SITUATED INDIVIDUALS

(75) Inventors: Suresh R. Rao, Cupertino, CA (US); Christopher L. Mocko, Palo Alto, CA (US); Shailesh J. Hingole, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/756,851

(22) Filed: Apr. 8, 2010

(51) Int. Cl.
*G06Q 40/00* (2006.01)
(52) U.S. Cl. ...................................... 705/36 R
(58) Field of Classification Search .............. 705/36 R
See application file for complete search history.

(56) References Cited

U.S. PATENT DOCUMENTS

| | | | | |
|---|---|---|---|---|
| 7,729,964 | B2 * | 6/2010 | Senturk et al. ............. | 705/35 |
| 2004/0230612 | A1 * | 11/2004 | Mattson et al. ............ | 707/104.1 |
| 2005/0108268 | A1 * | 5/2005 | Saintry et al. ............. | 707/102 |
| 2008/0195451 | A1 * | 8/2008 | Abram ...................... | 705/8 |
| 2009/0281873 | A1 * | 11/2009 | Yaskin ....................... | 705/10 |

OTHER PUBLICATIONS

University of California: Guidelines for special salary equity funding, 2007, UCLA. pp. 1-2.*

Social Justice Institute (SJI): Guidelines for the use of focus groups, 2008, National Center for State Courts, pp. 1-24.*

Gilmartin, K: Identifying similarly situated employees in employment discrimination cases, Summer 1991, Journal of Law, Science and Technology, vol. 31, No. 4, pp. 1-14.*

Del Favero et al., "Method and System for Providing Intelligent Targeted Budgeting Using Financial Transaction Data from Similarly Situated Individuals," U.S. Appl. No. 12/771,023, filed Apr. 30, 2010.

* cited by examiner

*Primary Examiner* — Bijendra K Shrestha
(74) *Attorney, Agent, or Firm* — McKay and Hodgson, LLP; Philip McKay; Sean P. Lewis

(57) ABSTRACT

A method and system for providing budget recommendations based on financial data from similarly situated individuals whereby financial transaction data associated with a given individual is analyzed to identify financial profile information associated with the given individual. The financial profile information associated with the given individual is then used to determine/define one or more "financial peer" identification criteria/parameters to be used for identifying individuals who are financially similarly situated with respect to the given individual. Financial data associated with various other individuals is obtained from one or more sources and the financial data associated with the other individuals is analyzed using the one or more financial peer identification criteria/parameters to identify one or more financial peers of the given individual. The financial data associated with the identified one or more financial peers of the given individual is then analyzed, aggregated, averaged, and/or otherwise processed, to provide the given individual one or more budget recommendations.

24 Claims, 2 Drawing Sheets

METHOD AND SYSTEM FOR PROVIDING BUDGETING RECOMMENDATIONS BASED ON FINANCIAL DATA FROM SIMILARLY SITUATED INDIVIDUALS

BACKGROUND

For most individuals, being aware of, and monitoring, the state of their finances and tracking their overall financial situation or "financial health" should be an extremely important and fundamental responsibility. Unfortunately, due to a lack of time, limits of currently available resources, and in some instances, a lack of motivation, many individuals have historically failed to recognize and accept this responsibility. However, recent economic events have reminded many individuals of the urgent need to know, and monitor, the state of their finances and financial health.

Several computing system implemented and/or on-line implemented financial management systems are currently available to help an individual, or an authorized user on behalf of an individual, gather an individual's own financial data and/or process/analyze that individual's own financial data. Typically, these currently available financial management systems provide an individual/user with financial data such as, but not limited to, the individual's overall financial position data, the individual's income data, the individual's expense data, and the individual's transactional data, all typically directed solely to the individual's own situation and/or activities. However, many individuals fail to take advantage of all the features offered by currently available financial management systems. This is often because of the individuals' unwillingness to devote the time and energy required to initially implement many of the features offered by currently available financial management systems.

One feature that is often under utilized by many actual, and potential, users of currently available financial management systems is the budgeting feature. This is because budgeting features available through currently available financial management systems not only typically require significant data entry and analysis by the user, but the budgets eventually provided are typically created based strictly on the individual's own historical spending, situation, activities, and/or stated goals. Consequently, budgeting features available through currently available financial management systems are often very time consuming and difficult to create, are largely created in isolation based solely on the user's own financial data, and often provide the user little or no guidance on how to start to budget their money and/or how their budgets compare with others.

Some currently available financial management systems provide users very limited and generalized financial statistics and/or recommendations/guidelines. However, using these currently available financial management systems, the user is typically required to provide significant data input and then, for their efforts, the user is often provided only highly generalized statistics and/or recommendations/guidelines that are typically of limited value to the user since they are often based on general spending assumptions and overly broad groupings that do not necessarily apply to the individual's specific financial situation, the individual's specific financial data, or the given individual's peers. Consequently, the currently available generalized "rule of thumb" statistics and/or budget recommendations/guidelines usually fail to provide the user/individual with any truly useful data, or the necessary motivation to modify their spending habits in order to establish more sound financial practices.

As a result of the situation described above, many individuals using currently available financial management systems do not make use of the budgeting features due to a lack of initial budgeting guidelines, the energy required to implement the budgeting features, and the limited value of the data provided by the currently available budgeting features. Consequently, using currently available financial management systems, individuals often fail to obtain the benefits of both a realistic budget and the comparative analysis and the "wisdom of the masses" that has become available with the advent of the Internet, improved processing power, and improved data storage.

SUMMARY

In accordance with one embodiment, a method and system for providing budget recommendations based on financial data from similarly situated individuals includes a process for providing budget recommendations based on financial data from similarly situated individuals whereby, in one embodiment, a financial management system is provided and historical financial transaction data associated with a given individual is obtained through the financial management system. In one embodiment, the financial transaction data associated with the given individual is then analyzed to identify financial profile information associated with the given individual, such as, but not limited to: income; expenses; area of residence; home ownership status; marital status; dependents; and/or demographic data for the given individual. In one embodiment, the financial profile information associated with the given individual is then used to determine/define one or more "financial peer" identification criteria/parameters to be used for identifying individuals who are financially similarly situated with respect to the given individual. In one embodiment, financial data associated with various other individuals, i.e., individuals other than the given individual, is obtained from one or more sources, in one embodiment, using a financial management system. In one embodiment, the financial data associated with the other individuals is analyzed using the one or more financial peer identification criteria/parameters to identify one or more financial peers of the given individual. In one embodiment, the financial data associated with the identified one or more financial peers of the given individual is then analyzed, aggregated, averaged, and/or otherwise processed, to provide the given individual one or more budget recommendations.

Using the method and system for providing budget recommendations based on financial data from similarly situated individuals disclosed herein, an individual's actual financial transaction data is used to identify financial peers of the individual. Then, using the method and system for providing budget recommendations based on financial data from similarly situated individuals disclosed herein, the aggregated, averaged, and/or otherwise processed, budget/spending data for the identified financial peers of the given individual is used to provide the individual with an initial budget template and/or guidelines, and/or a comparison between the aggregated, averaged, and/or otherwise processed budget/spending data for the identified one or more financial peers of the given individual and the financial transaction data, and/or budgeting data, associated with given individual.

Consequently, using the method and system for providing budget recommendations based on financial data from similarly situated individuals disclosed herein, not only are individuals spared the need to expend time and energy entering large amounts of budgeting data required to initiate currently available budgeting features, but they can immediately benefit from the comparative analysis and the "wisdom of the masses" that has become available with the advent of the Internet, improved processing power, and improved data storage.

As discussed in more detail below, using the below embodiments, with little or no modification and/or user input, there is considerable flexibility, adaptability, and opportunity for customization to meet the specific needs of various users under numerous circumstances.

Figure 1:
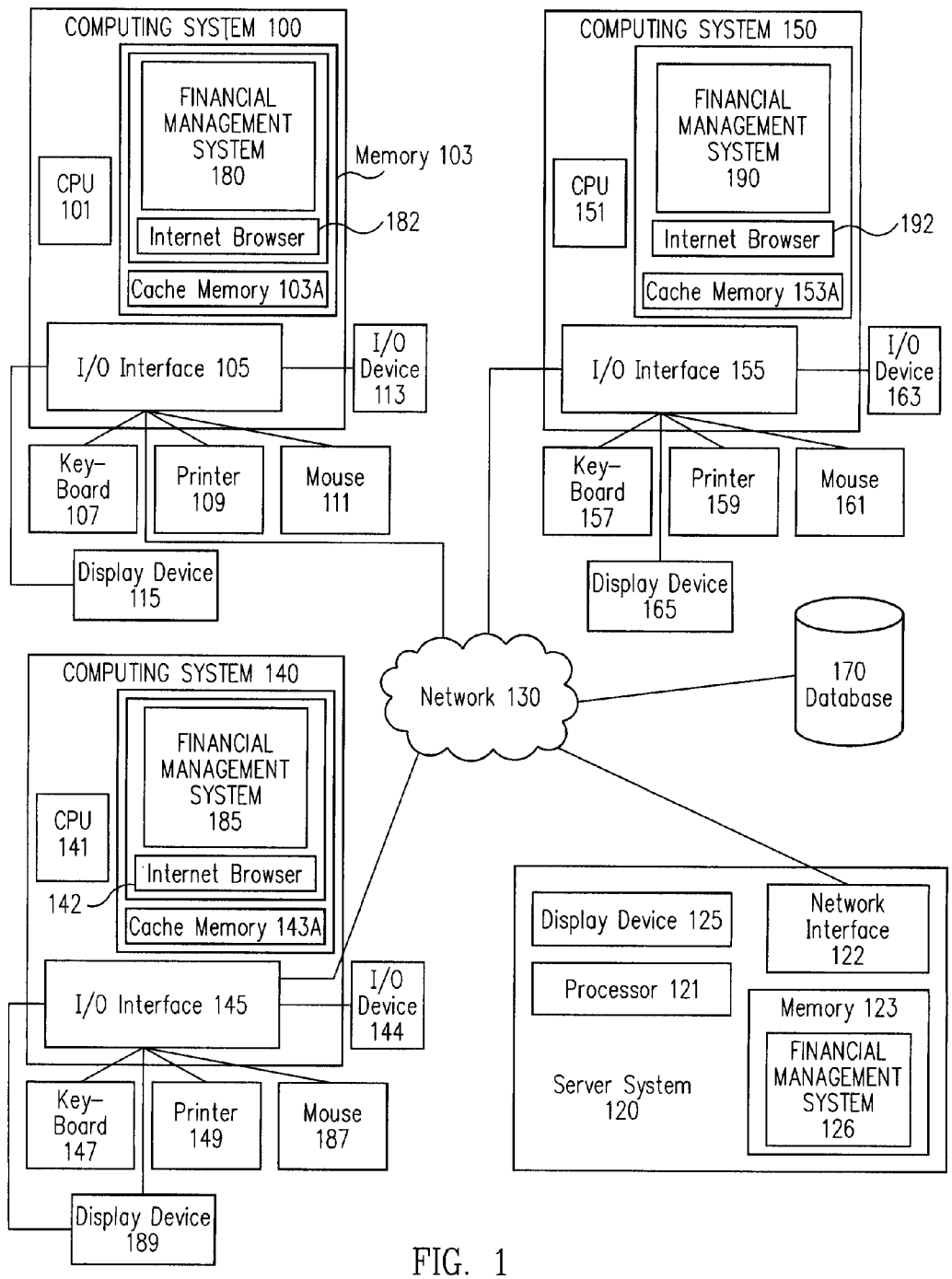
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing budget recommendations based on financial data from similarly situated individuals includes a process for providing budget recommendations based on financial data from similarly situated individuals whereby, in one embodiment, a financial management system is provided and historical financial transaction data associated with a given individual is obtained through the financial management system. In one embodiment, the financial transaction data associated with the given individual is then analyzed to identify financial profile information associated with the given individual, such as, but not limited to: income; expenses; area of residence; home ownership status; marital status; dependents; and/or demographic data for the given individual. In one embodiment, the financial profile information associated with the given individual is then used to determine/define one or more "financial peer" identification criteria/parameters to be used for identifying individuals who are financially similarly situated with respect to the given individual. In one embodiment, financial data associated with various other individuals, i.e., individuals other than the given individual, is obtained from one or more sources, in one embodiment, using a financial management system. In one embodiment, the financial data associated with the other individuals is analyzed using the one or more financial peer identification criteria/parameters to identify one or more financial peers of the given individual. In one embodiment, the financial data associated with the identified one or more financial peers of the given individual is then analyzed, aggregated, averaged, and/or otherwise processed, to provide the given individual one or more budget recommendations.

In one embodiment, access to the financial data associated with the various individuals and/or the given individual is obtained through a financial management system that implements, includes, is accessible by, and/or is otherwise associated with the process for providing budget recommendations based on financial data from similarly situated individuals.

In one embodiment, the financial management system is a computing system implemented financial management system and/or an on-line financial management system.

Herein, the term financial management system includes, but is not limited to, any computing system implemented, on-line or web-based, system, package, program, module, or application that gathers financial data, has the capability to analyze and categorize at least part of the financial data into various reports or displays that are provided to the user, and provides the user with the capability to conduct, and/or monitor, financial transactions and includes a budgeting feature.

Types of financial management systems include, but are not limited to any of the following: an on-line, or web-based, or computing system implemented personal financial management system, package, program, module, or application; an on-line, or web-based, or computing system implemented personal/home business inventory system, package, program, module, or application; an on-line, or web-based, or computing system implemented personal asset management system, package, program, module, or application; an on-line, or web-based, or computing system implemented business accounting system, package, program, module, or application; an on-line, or web-based, or computing system implemented business financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal accounting system, package, program, module, or application; an on-line, or web-based, or computing system implemented healthcare expense tracking system, package, program, module, or application; or any on-line, or web-based, data management system as discussed herein, and/or as known in the art at the time of filing, and/or as developed after the time of filing.

Specific examples of financial management systems currently available include, but are not limited to: Quicken Finance Works' available from Intuit Inc. of Mountain View, Calif.; Mint.com™, available from Intuit Inc. of Mountain View, Calif.; Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quickbooks Online™, available from Intuit Inc. of Mountain View, Calif.; Quicken Healthcare Expense Tracker™ available from Intuit Inc. of Mountain View, Calif.; Microsoft Money™, available from Microsoft, Inc. of Redmond, Wash.; or various other financial management systems discussed herein, or known to those of skill in the art at the time of filing, or as developed after the time of filing.

In one embodiment, historical financial transaction data associated with a given individual is obtained through the financial management system for a defined time frame.

In various embodiments, the defined time frame can be any time frame desired such as, but not limited to: days, weeks, months, years, etc.

In one embodiment, the historical financial transaction data associated with a given individual is provided to, and/or entered into, and/or transferred to, and/or downloaded to, and/or otherwise obtained by, the process for providing budget recommendations based on financial data from similarly situated individuals and/or the financial management system associated with the process for providing budget recommendations based on financial data from similarly situated individuals from the given individual, a bank, credit card company, a credit reporting agency or bureau, and/or any other financial institution or data source via any network or network system, as discussed herein, and/or available or known at the time of filing, and/or as later developed.

In one embodiment, the historical financial transaction data associated with a given individual is provided to, and/or entered into, and/or transferred to, and/or downloaded to, and/or otherwise obtained by, the process for providing budget recommendations based on financial data from similarly situated individuals and/or the financial management system associated with the process for providing budget recommendations based on financial data from similarly situated individuals from the given individual, a bank, credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, the historical financial transaction data associated with a given individual is provided to, and/or entered into, and/or transferred to, and/or downloaded to, and/or otherwise obtained by, the process for providing budget recommendations based on financial data from similarly situated individuals and/or the financial management system associated with the process for providing budget recommendations based on financial data from similarly situated individuals from the given individual, a bank, credit card company, a credit reporting agency or bureau, and/or any other financial institution or data source via a database, such as any database as discussed herein, and/or available or known at the time of filing, and/or as later developed.

In one embodiment, the historical financial transaction data associated with a given individual is provided to, and/or entered into, and/or transferred to, and/or downloaded to, and/or otherwise obtained by, the process for providing budget recommendations based on financial data from similarly situated individuals and/or the financial management system associated with the process for providing budget recommendations based on financial data from similarly situated individuals from the given individual, a bank, credit card company, a credit reporting agency or bureau, and/or any other financial institution or data source by embedding the data in, or on, a computer program product, as discussed herein and providing the computer program product to the provider of financial management system associated with the process for providing budget recommendations based on financial data from similarly situated individuals and/or the process for providing budget recommendations based on financial data from similarly situated individuals.

In one embodiment, the historical financial transaction data associated with a given individual is provided to, and/or entered into, and/or transferred to, and/or downloaded to, and/or otherwise obtained by, the process for providing budget recommendations based on financial data from similarly situated individuals and/or the financial management system associated with the process for providing budget recommendations based on financial data from similarly situated individuals from the given individual, a bank, credit card company, a credit reporting agency or bureau, and/or any other financial institution or data source via any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the financial transaction data associated with the given individual is analyzed to identify financial profile information associated with the given individual using one or more processors associated with one or more computing systems.

In one embodiment, the financial transaction data associated with the given individual is analyzed to identify financial transactions and/or financial transaction data associated with, or identifying, financial profile information associated with the given individual, such as, but not limited to: income; expenses; area of residence; home ownership status; marital status; dependents; and/or demographic data for a given individual.

For instance, as one illustrative example, the financial transaction data associated with the given individual is analyzed to identify one or more recurring income transactions that would indicate the income for the given individual based on the payor of the transaction or other data associated with the transaction. As another illustrative example, the financial transaction data associated with the given individual is analyzed to identify one or more transactions associated with home ownership or rental status based on the payor of the transaction or other data associated with the transaction. As another illustrative example, the financial transaction data associated with the given individual is analyzed to identify one or more expense transactions associated with one or more dependents such as child care or school related transactions. As another illustrative example, the financial transaction data associated with the given individual is analyzed to identify an area of residence.

In various embodiments, the financial transaction data associated with the given individual is analyzed to identify any other desired financial profile information associated with the given individual, as discussed herein, and/or as known in the art at the time of filing, and/or as developed after the time of filing.

In one embodiment, any, or all, of the financial profile information associated with the given individual is used as, or to determine/define, one or more "financial peer" identification criteria/parameters to be used for identifying individuals who are financially similarly situated with respect to the given individual. For instance, in various embodiments, the financial peer identification criteria/parameters can include, but are not limited to: an income range; an expenses range; an area of residence; home ownership status; marital status; existence and/or number of dependents; and/or demographic data. In some embodiments, the financial peer identification criteria/parameters can be based on more detailed information such as, but are not limited to: the given individual's age; the given individual's occupation; the given individual's average contributions to saving accounts and/or programs over a given time; the given individual's savings account balances; the given individual's average contributions to retirement accounts and/or programs over a given time; the given individual's balances in retirement accounts and/or programs; the given individual's average balances in checking; the given individual's mortgage/rent payments; the given individual's equity in real estate; the given individual's stocks and other holdings; the given individual's healthcare expenses; the given individual's specific spending in defined categories and/or with specific merchants; and/or any other financial and/or demographic data desired/defined by the provider of the process for providing budget recommendations based on financial data from similarly situated individuals and/or a user of the process for providing budget recommendations based on financial data from similarly situated individuals.

In one embodiment, financial data, in one embodiment including financial transaction data and/or budgeting data, associated with various other individuals, i.e., individuals other than the given individual, is obtained from one or more of sources, such as any of the sources discussed herein, and/or as known in the art at the time of filing, and/or as developed after the time of filing.

In one embodiment, the financial data associated with various other individuals is obtained through the same financial management system used to obtain the financial transaction data associated with the given individual and/or any financial management system discussed herein, and/or as known in the art at the time of filing, and/or as developed after the time of filing.

In various embodiments, the financial data associated with the other individuals includes, but is not limited to, financial transaction data associated with the other individuals and/or data indicating: the other individual's budgets and/or budget categories; the other individual's spending in one or more budget categories; the other individual's age; the other individual's area of residence; the other individual's marital status; the other individual's dependents; the other individual's occupation; the other individual's income, and/or household income, from all sources; the other individual's average contributions to saving accounts and/or programs over a given time; the other individual's savings account balances; the other individual's average contributions to retirement accounts and/or programs over a given time; the other individual's balances in retirement accounts and/or programs; the other individual's average balances in checking; the other individual's mortgage/rent payments; the other individual's equity in real estate; the other individual's stocks and other holdings; the other individual's healthcare expenses; the other individual's financial transaction data, including specific spending in defined categories and/or with specific merchants; and/or any other financial and/or demographic data desired/defined by the provider of the process for providing budget recommendations based on financial data from similarly situated individuals and/or a user of the process for providing budget recommendations based on financial data from similarly situated individuals.

In one embodiment, the financial data associated with the other individuals is analyzed by one or more processors associated with one or more computing systems to identify one or more financial peers of the given individual using the one or more financial peer identification criteria/parameters.

In one embodiment, the financial data associated with the identified one or more financial peers of the given individual is analyzed, aggregated, averaged, and/or otherwise processed, using one or more processors associated with one or more computing systems and the results are used to provide the given individual one or more budget recommendations.

In one embodiment, the financial data associated with the identified one or more financial peers of the given individual is analyzed, aggregated, averaged, and/or otherwise processed, to provide given individual who is a new user of a budgeting feature a budget template with initial budgetary guidelines, and/or budgetary categories, and/or budgetary amounts for one or more budget categories, based, at least in part, on the financial data associated with the identified one or more financial peers of the given individual.

In one embodiment, the financial transaction data, and/or budgeting data, associated with the identified one or more financial peers of the given individual and the financial transaction data, and/or budgeting data, associated with given individual is analyzed and/or compared and the given individual is provided a comparison of the given individual's budget/spending data with the aggregated, averaged, and/or otherwise processed budget/spending data for the identified one or more financial peers of the given individual.

In one embodiment, the given individual is provided one or more graphical displays and/or data displays showing the recommended budget template and/or a comparison between the aggregated, averaged, and/or otherwise processed budget/spending data for the identified one or more financial peers of the given individual and the financial transaction data, and/or budgeting data, associated with given individual in the form of any symbol or graphical display capable of visually showing the recommended budget template and/or a comparison between the aggregated, averaged, and/or otherwise processed budget/spending data for the identified one or more financial peers of the given individual and the financial transaction data, and/or budgeting data, associated with given individual.

As an example, a thermometer, a sliding scale, any graphical representation, or any partially filled figure or symbol, or outline thereof, may be used. Moreover, these symbols, graphical displays, and scales may, in various embodiments, display one or more of: the aggregated, averaged, and/or otherwise processed budget/spending data for the identified one or more financial peers of the given individual; the financial transaction data, and/or budgeting data, associated with given individual; and/or differential between the aggregated, averaged, and/or otherwise processed budget/spending data for the identified one or more financial peers of the given individual and the financial transaction data, and/or budgeting data, associated with given individual.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual in the form of a summary report.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual as a display displayed on any display device accessible by the individual such as any display device discussed herein, and/or known in the art at the time of filing, and/or as developed after the time of filing. In one embodiment, the display device is associated with any computing system as discussed herein, and/or known in the art at the time of filing, and/or as developed after the time of filing.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by providing the individual, or any authorized user, access to one or more websites.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by giving the individual, or any authorized user, access to any database, computing system, and/or a server system, or any web-site or other web-based system, associated with the process for providing budget recommendations based on financial data from similarly situated individuals.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual using a computer program product as discussed herein.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a financial management system that is a parent system for, implements, and/or is otherwise associated with, the process for providing budget recommendations based on financial data from similarly situated individuals.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a computing system implemented data management system that is a parent system for, implements, and/or is otherwise associated with, the process for providing budget recommendations based on financial data from similarly situated individuals.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through any network of computing systems and/or server systems that is comprised of multiple different computers, wireless devices, cellular telephones, digital telephones, two-way pagers, personal digital assistants, server computers, or any desired combination of these devices, that are interconnected using a network as discussed herein, and/or known in the art at the time of filing, and/or as developed after the time of filing.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through e-mail or through text messaging.

In one embodiment, the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the given individual is also provided access to data representing advice regarding any recommended changes and/or allocation of funds the individual might wish to make in order to better align the individual's own financial position with the average financial position of the identified similarly situated individuals.

In one embodiment, once the given individual implements the budgeting feature and creates their own budget, the budgeting data and/or financial data associated with the given individual is provided to process for providing budget recommendations based on financial data from similarly situated individuals as feedback and/or for use with future budget recommendations.

FIG. 1 is a block diagram of an exemplary hardware architecture for implementing one embodiment of a system and method for providing budget recommendations based on financial data from similarly situated individuals, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a financial management system 180, such as any financial management system defined herein, known in the art at the time of filing, and/or as developed thereafter. In one embodiment, financial management system 180 is stored, in whole, or in part, in memory system 103, and is used by, or includes, or is accessed by, a process for providing budget recommendations based on financial data from similarly situated individuals (not shown in FIG. 1, see FIG. 2) and/or a given individual.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing budget recommendations based on financial data from similarly situated individuals, and/or a financial management system, are entered, in whole, or in part, into computing system 100 via I/O device 113, such as from a CD, DVD, floppy disk, portable hard drive, memory stick, download site, or other medium and/or computer program product as discussed herein.

In one embodiment, computing system 100 also includes an Internet browser capability 182 that, in one embodiment, includes a search engine (not shown) and is stored, in whole, or in part in memory 103.

In one embodiment, financial data associated with a given individual is stored, in whole, or in part, in memory system 103, and is used by, or is accessed by, a process for providing budget recommendations based on financial data from similarly situated individuals and/or one or more users. In one embodiment, computing system 100 is a computing system accessible by one or more users. In one embodiment, computing system 100 is used, and/or accessible, by another computing system, such as computing systems 150 and/or 140 (discussed below).

In one embodiment, computing system 100 is used, controlled, provided, and/or otherwise associated with a given individual and/or an authorized user that is a representative of the given individual, and data representing all, or part, of financial data associated with the given individual, is stored in computing system 100.

Computing system 100 can be any computing system as discussed herein and/or as known in the art at the time of filing and/or as developed thereafter, that includes components that can execute all, or part, of a process for providing budget recommendations based on financial data from similarly situated individuals, and/or a financial management system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a financial management system 190, such as any financial management system defined herein, known in the art at the time of filing, and/or as developed thereafter. In one embodiment, financial management system 190 is stored, in whole, or in part, in memory system 153, and is used by, or includes, or is accessed by, and/or is otherwise associated with a process for providing budget recommendations based on financial data from similarly situated individuals (not shown in FIG. 1, see FIG. 2) and/or one or more other individuals, i.e., an individual other than the given individual.

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for providing budget recommendations based on financial data from similarly situated individuals, and/or a financial management system, are entered, in whole, or in part, into computing system 150 via I/O device 163, such as from a CD, DVD, floppy disk, portable hard drive, memory stick, download site, or other medium and/or computer program product as discussed herein.

In one embodiment, computing system 150 also includes an Internet browser capability 192 that, in one embodiment, includes a search engine (not shown) and is stored, in whole, or in part in memory 153.

In one embodiment, data associated one or more other individuals is stored, in whole, or in part, in memory system 153, and is used by, or is accessed by, a process for providing budget recommendations based on financial data from similarly situated individuals and/or one or more users. In one embodiment, computing system 150 is a computing system accessible by one or more users. In one embodiment, computing system 150 is used, and/or accessible, by another computing system, such as computing systems 100 and/or 140 (discussed below).

Computing system 150 can be any computing system as discussed herein and/or as known in the art at the time of filing and/or as developed thereafter, that includes components that can execute all, or part, of a process for providing budget recommendations based on financial data from similarly situated individuals, and/or a financial management system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a financial management system 185, such as any computing system implemented data management system defined herein, known in the art at the time of filing, and/or as developed thereafter. In one embodiment, financial management system 185 is stored, in whole, or in part, in memory system 143, and is used by, or includes, or is accessed by, a process for providing budget recommendations based on financial data from similarly situated individuals (not shown in FIG. 1, see FIG. 2) and/or one or more other individuals.

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for providing budget recommendations based on financial data from similarly situated individuals, and/or a computing system implemented data management system, are entered, in whole, or in part, into computing system 140 via I/O device 144, such as from a CD, DVD, floppy disk, portable hard drive, memory stick, download site, or other medium and/or computer program product as discussed herein.

In one embodiment, computing system 140 also includes an Internet browser capability 142 that, in one embodiment, includes a search engine (not shown) and is stored, in whole, or in part in memory 143.

In one embodiment, data associated with a process for providing budget recommendations based on financial data from similarly situated individuals and/or one or more individuals is stored, in whole, or in part, in memory system 143. In one embodiment, computing system 140 is a computing system accessible by one or more users. In one embodiment, computing system 140 is used, and/or accessible, by another computing system, such as computing systems 150 and/or 100.

Computing system 140 can be any computing system as discussed herein and/or as known in the art at the time of filing and/or as developed thereafter, that includes components that can execute all, or part, of a process for providing budget recommendations based on financial data from similarly situated individuals, and/or a computing system implemented data management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing budget recommendations based on financial data from similarly situated individuals, and/or a financial management system and/or a computing system implemented data management system.

In one embodiment, financial data associated with one or more individuals, and/or a process for providing budget recommendations based on financial data from similarly situated individuals, and/or one or more financial management systems, and/or one or more computing system implemented data management systems, is stored, in whole, or in part, in database 170, and is used by, or is accessed by, a process for providing budget recommendations based on financial data from similarly situated individuals. In one embodiment, database 170 is accessible by one or more users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system memory 123 includes all, or part, of a financial management system 126, such as any financial management system defined herein, known in the art at the time of filing, and/or as developed thereafter. In one embodiment, financial management system 126 is stored, in whole, or in part, in memory system 123, and is used by, or includes, or is accessed by, and/or is otherwise associated with a process for providing budget recommendations based on financial data from similarly situated individuals (not shown in FIG. 1, see FIG. 2) and/or one or more individuals, i.e., the given individual and/or any individuals other than the given individual.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more individuals, and/or a process for providing budget recommendations based on financial data from similarly situated individuals, and/or one or more financial management systems, and/or one or more computing system implemented data management systems, is stored, in whole, or in part, in server system 120, and is used by, or is accessed by, a process for providing budget recommendations based on financial data from similarly situated individuals. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as discussed herein, and/or known in the art at the time of filing, and/or as developed after the time of filing, capable of allowing communication between two or more computing systems, server systems, and/or databases.

In on embodiment, computing systems 100, 140, and 150, and database 170, and server system 120 are part of a cloud computing environment.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 are not relevant.

As discussed in more detail below, in one embodiment, a process for providing budget recommendations based on financial data from similarly situated individuals, and/or a financial management system, and/or a computing system implemented data management system, and/or data associated with one or more individuals, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for providing budget recommendations based on financial data from similarly situated individuals, and/or a financial management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing budget recommendations based on financial data from similarly situated individuals, and/or a financial management system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for providing budget recommendations based on financial data from similarly situated individuals, and/or a financial management system, and/or a computing system implemented data management system, and/or data associated with one or more individuals, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "individual", "given individual", "other individuals", "user/individual", and "user" include any person, party, business, system, application, organization, and/or entity interacting with, interfacing with, contacting, viewing, providing data to, accepting data from, requesting data from, and/or otherwise associating with the process for providing budget recommendations based on financial data from similarly situated individuals for any purpose. In addition, herein, the terms "individual", "given individual", "other individuals", "user/individual", and "user" can be used interchangeably to denote any party using a process for providing budget recommendations based on financial data from similarly situated individuals, and/or a person who is the subject of, source of, and/or target of, all, or part of, any data/information obtained and/or analysis performed by a process for providing budget recommendations based on financial data from similarly situated individuals, and/or a legal guardian of a person who is the subject of, and/or target of, any data/information obtained and/or analysis performed by a process for providing budget recommendations based on financial data from similarly situated individuals, and/or an authorized agent of any party using a process for providing budget recommendations based on financial data from similarly situated individuals, and/or a person who is the subject of, and/or target of, any information obtained and/or analysis performed, by a process for providing budget recommendations based on financial data from similarly situated individuals, and/or any other authorized party associated with any party using a process for providing budget recommendations based on financial data from similarly situated individuals, and/or a person who is the subject of, and/or target of, any information obtained and/or analysis performed by a process for providing budget recommendations based on financial data from similarly situated individuals.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; financial management systems, packages, programs, modules, or applications; financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a method and system for providing budget recommendations based on financial data from similarly situated individuals includes a process for providing budget recommendations based on financial data from similarly situated individuals whereby, in one embodiment, a financial management system is provided and historical financial transaction data associated with a given individual is obtained through the financial management system. In one embodiment, the financial transaction data associated with the given individual is then analyzed to identify financial profile information associated with the given individual, such as, but not limited to: income; expenses; area of residence; home ownership status; marital status; dependents; and/or demographic data for the given individual. In one embodiment, the financial profile information associated with the given individual is then used to determine/define one or more "financial peer" identification criteria/parameters to be used for identifying individuals who are financially similarly situated with respect to the given individual. In one embodiment, financial data associated with various other individuals, i.e., individuals other than the given individual, is obtained from one or more sources, in one embodiment, using a financial management system. In one embodiment, the financial data associated with the other individuals is analyzed using the one or more financial peer identification criteria/parameters to identify one or more financial peers of the given individual. In one embodiment, the financial data associated with the identified one or more financial peers of the given individual is then analyzed, aggregated, averaged, and/or otherwise processed, to provide the given individual one or more budget recommendations.

Figure 2:
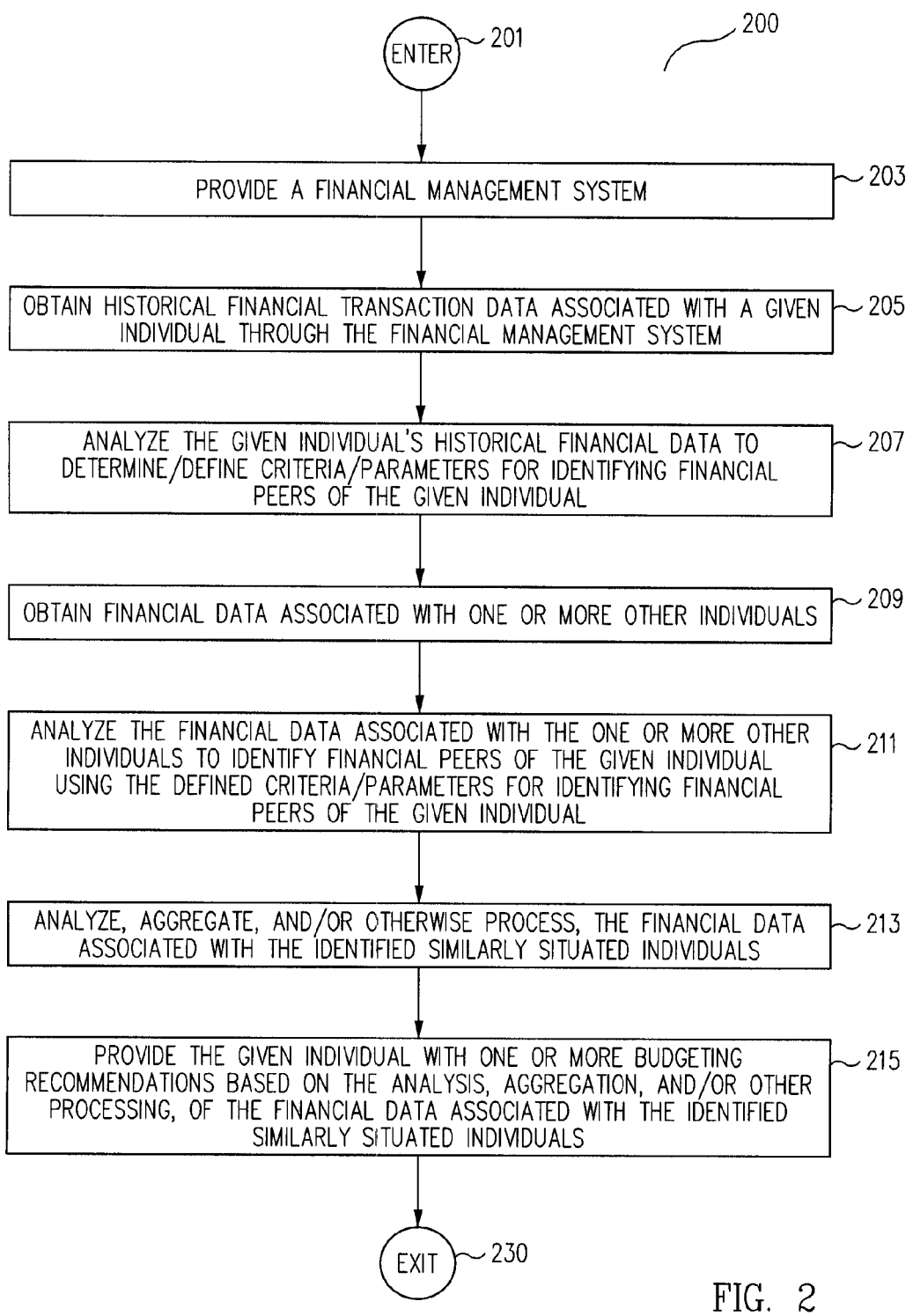
FIG. 2 is a flow chart depicting a process for providing budget recommendations based on financial data from similarly situated individuals in accordance with one embodiment.

FIG. 2 a flow chart depicting a process for providing budget recommendations based on financial data from similarly situated individuals 200 in accordance with one embodiment. Process for providing budget recommendations based on financial data from similarly situated individuals 200 begins at ENTER OPERATION 201 of FIG. 2 and process flow proceeds to PROVIDE A FINANCIAL MANAGEMENT SYSTEM OPERATION 203.

In one embodiment, at PROVIDE A FINANCIAL MANAGEMENT SYSTEM OPERATION 203 a financial management system is provided that includes a capability to obtain and/or access historical financial transaction data associated with a user.

In one embodiment, the financial management system is a computing system implemented financial management system, such as financial management systems 180, 190 and/or 185 of FIG. 1, and/or an on-line financial management system such as financial management system 126 of FIG. 1.

Herein, the term financial management system includes, but is not limited to, any computing system implemented, on-line or web-based, system, package, program, module, or application that gathers financial data, has the capability to analyze and categorize at least part of the financial data into various reports or displays that are provided to the user, and provides the user with the capability to conduct, and/or monitor, financial transactions and includes a budgeting feature.

Types of financial management systems include, but are not limited to any of the following: an on-line, or web-based, or computing system implemented personal financial management system, package, program, module, or application; an on-line, or web-based, or computing system implemented personal/home business inventory system, package, program, module, or application; an on-line, or web-based, or computing system implemented personal asset management system, package, program, module, or application; an on-line, or web-based, or computing system implemented business accounting system, package, program, module, or application; an on-line, or web-based, or computing system implemented business financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal accounting system, package, program, module, or application; an on-line, or web-based, or computing system implemented healthcare expense tracking system, package, program, module, or application; or any on-line, or web-based, data management system as discussed herein, and/or as known in the art at the time of filing, and/or as developed after the time of filing.

Specific examples of financial management systems currently available include, but are not limited to: Quicken Finance Works' available from Intuit Inc. of Mountain View, Calif.; Mint.com™, available from Intuit Inc. of Mountain View, Calif.; Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quickbooks Online™, available from Intuit Inc. of Mountain View, Calif.; Quicken Healthcare Expense Tracker™ available from Intuit Inc. of Mountain View, Calif.; Microsoft Money™, available from Microsoft, Inc. of Redmond, Wash.; or various other financial management systems discussed herein, or known to those of skill in the art at the time of filing, or as developed after the time of filing.

Returning to FIG. 2, current financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using financial management systems, the financial transaction information, payee identification, payee location, payment amount, date of the transaction, various tags and/or labels, and other data is often used by the financial management system to categorize and/or tag individual financial transactions as a particular type of income or expense, to generate various financial reports, and to create an overview of the individual's financial situation based on input from multiple, and often all, available sources of financial information regarding a given individual. Some currently offered financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, once a financial management system is provided that includes a capability to obtain and/or access historical financial transaction data associated with a user at PROVIDE A FINANCIAL MANAGEMENT SYSTEM OPERATION 203, process flow proceeds to OBTAIN HISTORICAL FINANCIAL TRANSACTION DATA ASSOCI- ATED WITH A GIVEN INDIVIDUAL THROUGH THE FINANCIAL MANAGEMENT SYSTEM OPERATION 205.

In one embodiment, at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 actual financial data, including data representing historical financial transactions associated with a given individual is obtained from one or more sources through the financial management system of PROVIDE A FINANCIAL MANAGEMENT SYSTEM OPERATION 203.

In one embodiment, at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 the historical financial transaction data associated with the given individual is obtained through the financial management system for a defined time frame.

In various embodiments, the defined time frame can be any historical time frame desired such as, but not limited to: previous days, weeks, months, years, etc.

In one embodiment, at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205, in addition to the historical financial transaction data associated with the given individual, other financial data associated with the given individual is obtained from one or more sources through the financial management system of PROVIDE A FINANCIAL MANAGEMENT SYSTEM OPERATION 203 including, but is not limited to: the individual's age; the individual's area of residence; the individual's marital status; the individual's dependents; the individual's occupation; the individual's income, and/or household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage payments; the individual's equity in real estate; the individual's stocks and other holdings; the individual's healthcare expenses; the individual's financial transaction data, including specific spending in defined categories and/or with specific merchants; and/or any other financial and/or demographic data desired/defined by the provider of process for providing budget recommendations based on financial data from similarly situated individuals 200 and/or a user of process for providing budget recommendations based on financial data from similarly situated individuals 200.

In one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 from the user/given individual, a bank, credit card company, a credit reporting agency or bureau, and/or any other financial institution or data source via any network or network system, such as network 130 of FIG. 1, and/or the Internet and/or as discussed herein, and/or available or known at the time of filing, and/or as later developed.

Returning to FIG. 2, in one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 from the user/given individual, a bank, credit card company, a credit reporting agency or bureau, and/or any other financial institution or data source through a user interface device, such as a keyboards 115, 165, or 147 of FIG. 1, mice 111, 161, or 187, touchpad, voice recognition software, or any other device and/or system capable of providing user input to a computing system and/or for translating user actions into computing system operations, whether available or known at the time of filing or as developed later.

Returning to FIG. 2, in one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 from a database, such as database 170 of FIG. 1, maintained by the user/given individual, a bank, a credit card company, credit reporting agency or bureau, and/or any other financial institution or data source, as discussed herein, and/or available or known at the time of filing, and/or as later developed.

Returning to FIG. 2, in one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 by embedding the data in, or on, a computer program product, as discussed herein, and providing the computer program product to the provider of financial management system associated with process for providing budget recommendations based on financial data from similarly situated individuals 200 and/or process for providing budget recommendations based on financial data from similarly situated individuals 200.

In one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, stocks, mutual funds, investment accounts, or other financial resources, accounts and/or services used by an individual to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by the given individual to pay for and/or conduct financial transactions.

In one embodiment, access to at least part of the historical financial transaction data associated with the given individual and/or other financial data associated with the given individual is obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once actual financial data, including data representing historical financial transactions associated with a given individual is obtained from one or more sources through the financial management system of PROVIDE A FINANCIAL MANAGEMENT SYSTEM OPERATION 203 at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 process flow proceeds to ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207.

In one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual, and/or the other financial data associated with the given individual, of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 is analyzed to identify financial profile information associated with the given individual, such as, but not limited to: income; expenses; area of residence; home ownership status; marital status; dependents; and/or demographic data for the given individual and, in one embodiment, the financial profile information associated with the given individual is then used to determine/define one or more "financial peer" identification criteria/parameters to be used for identifying individuals who are financially similarly situated with respect to the given individual.

In one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual, and/or the other financial data associated with the given individual, is analyzed to identify financial profile information associated with the given individual using one or more processors associated with one or more computing systems, such as CPUs 101, 141, 151 and/or processor 121 of FIG. 1.

Returning to FIG. 2, in one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify historical financial transactions and/or historical financial transaction data associated with, or identifying, financial profile information associated with the given individual, such as, but not limited to: income; expenses; area of residence; home ownership status; marital status; dependents; and/or demographic data for a given individual.

For instance, as one illustrative example, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify one or more recurring income transactions that would indicate the income for the given individual based on the payor of the transaction or other data associated with the transaction. In addition, multiple recurring income transactions can be used to identify multiple incomes for a household or given individual and, in one embodiment, these identified multiple income transactions are added to determine total income associated with the given individual and/or the given individual's household.

As another illustrative example, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify one or more transactions associated with home ownership or rental status based on the payor of the transaction or other data associated with the transaction.

As another illustrative example, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify one or more expense transactions associated with one or more dependents, such as child care or school related transactions, thereby indicating the given individual has dependents and, in some cases, how many dependents.

As another illustrative example, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify an area of residence.

In various embodiments, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207, the historical financial transaction data associated with the given individual is analyzed to identify any other desired financial profile information associated with the given individual, as discussed herein, and/or as known in the art at the time of filing, and/or as developed after the time of filing.

In one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify historical financial transactions and/or historical financial transaction data associated with, or identifying, financial profile information associated with the given individual automatically when the financial management system and/or the budgeting feature is accessed.

In one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify historical financial transactions and/or historical financial transaction data associated with, or identifying, financial profile information associated with the given individual semi-automatically, upon user approval, when the financial management system and/or the budgeting feature is accessed.

In one embodiment, at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 the historical financial transaction data associated with the given individual is analyzed to identify historical financial transactions and/or historical financial transaction data associated with, or identifying, financial profile information associated with the given individual upon user activation/request.

As noted above, in one embodiment, at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205, in addition to the historical financial transaction data associated with the given individual, other financial data associated with the given individual is obtained from one or more sources through the financial management system of PROVIDE A FINANCIAL MANAGEMENT SYSTEM OPERATION 203 including, but is not limited to: the individual's age; the individual's area of residence; the individual's marital status; the individual's dependents; the individual's occupation; the individual's income, and/or household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage payments; the individual's equity in real estate; the individual's stocks and other holdings; the individual's healthcare expenses; the individual's financial transaction data, including specific spending in defined categories and/or with specific merchants; and/or any other financial and/or demographic data desired/defined by the provider of process for providing budget recommendations based on financial data from similarly situated individuals 200 and/or a user of process for providing budget recommendations based on financial data from similarly situated individuals 200.

As a result, in some embodiments, any, or all, of this other financial data associated with the given individual is also used as, or to determine/define, one or more "financial peer" identification criteria/parameters to be used for identifying individuals who are financially similarly situated with respect to the given individual.

In one embodiment, based on the analysis of ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 and/or on the other financial data obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205, the financial peer identification criteria/parameters determined/defined at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 can include, but are not limited to: an income range; an expenses range; an area of residence; home ownership status; marital status; existence and/or number of dependents; and/or demographic data, as well as, in some embodiments: the given individual's age; the given individual's occupation; the given individual's average contributions to saving accounts and/or programs over a given time; the given individual's savings account balances; the given individual's average contributions to retirement accounts and/or programs over a given time; the given individual's balances in retirement accounts and/or programs; the given individual's average balances in checking; the given individual's mortgage/rent payments; the given individual's equity in real estate; the given individual's stocks and other holdings; the given individual's healthcare expenses; the given individual's specific spending in defined categories and/or with specific merchants; and/or any other financial and/or demographic data desired/defined by the provider of process for providing budget recommendations based on financial data from similarly situated individuals 200 and/or a user of process for providing budget recommendations based on financial data from similarly situated individuals 200.

In one embodiment, once the historical financial transaction data associated with the given individual, and/or the other financial data associated with the given individual, of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 is analyzed to identify financial profile information associated with the given individual, such as, but not limited to: income; expenses; area of residence; home ownership status; marital status; dependents; and/or demographic data for the given individual and, in one embodiment, the financial profile information associated with the given individual is then used to determine/define one or more "financial peer" identification criteria/parameters to be used for identifying individuals who are financially similarly situated with respect to the given individual at ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207, process flow proceeds to OBTAIN FINANCIAL DATA ASSOCIATED WITH ONE OR MORE OTHER INDIVIDUALS OPERATION 209.

In one embodiment at OBTAIN FINANCIAL DATA ASSOCIATED WITH ONE OR MORE OTHER INDIVIDUALS OPERATION 209 financial data associated with various other individuals, i.e., individuals other than the given individual of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205, is obtained from one or more sources.

In one embodiment, the financial data associated with the with the one or more other individuals obtained at OBTAIN FINANCIAL DATA ASSOCIATED WITH ONE OR MORE OTHER INDIVIDUALS OPERATION 209 includes, but is not limited to: data representing historical financial transactions associated with the other individual; the other individual's age; the other individual's area of residence; the other individual's marital status; the other individual's dependents; the other individual's occupation; the other individual's income, and/or household income, from all sources; the other individual's average contributions to saving accounts and/or programs over a given time; the other individual's savings account balances; the other individual's average contributions to retirement accounts and/or programs over a given time; the other individual's balances in retirement accounts and/or programs; the other individual's average balances in checking; the other individual's mortgage/rent payments; the other individual's equity in real estate; the other individual's stocks and other holdings; the other individual's healthcare expenses; the other individual's financial transaction data, including specific spending in defined categories and/or with specific merchants; and/or any other financial and/or demographic data desired/defined by the provider of process for providing budget recommendations based on financial data from similarly situated individuals 200 and/or a user of process for providing budget recommendations based on financial data from similarly situated individuals 200.

In one embodiment, at least part of the financial data associated with the one or more other individuals is obtained at OBTAIN FINANCIAL DATA ASSOCIATED WITH ONE OR MORE OTHER INDIVIDUALS OPERATION 209 through one or more financial management systems, such as financial management systems 180, 185, and/or 190 of FIG. 1, and/or one or more computing system implemented data management systems that implement, include, are accessible by, and/or are otherwise associated with process for providing budget recommendations based on financial data from similarly situated individuals 200 (FIG. 2). In various embodiments, the one or more financial management systems, and/or one or more computing system implemented data management systems, can be any of the numerous financial management systems, and/or computing system implemented data management systems, as discussed herein, and/or known to those of skill in the art at the time of filing, and/or as developed after the time of filing.

In one embodiment, at least part of the financial data associated with the one or more other individuals is obtained at OBTAIN FINANCIAL DATA ASSOCIATED WITH ONE OR MORE OTHER INDIVIDUALS OPERATION 209 from the user/individuals, a bank, credit card company, a credit reporting agency or bureau, and/or any other financial institution or data source via any network or network system, such as network 130 of FIG. 1 and/or as discussed herein, and/or available or known at the time of filing, and/or as later developed.

Returning to FIG. 2, in one embodiment, at least part of the financial data associated with the one or more other individuals is obtained at OBTAIN FINANCIAL DATA ASSOCIATED WITH ONE OR MORE OTHER INDIVIDUALS OPERATION 209 from the user/individuals, a bank, credit card company, a credit reporting agency or bureau, and/or any other financial institution or data source through a user interface device, such as a keyboards 115, 165, or 147 of FIG. 1, mice 111, 161, or 187, touchpad, voice recognition software, or any other device and/or system capable of providing user input to a computing system and/or for translating user actions into computing system operations, whether available or known at the time of filing or as developed later.

Returning to FIG. 2, in one embodiment, at least part of the financial data associated with the one or more other individuals is obtained at OBTAIN FINANCIAL DATA ASSOCIATED WITH ONE OR MORE OTHER INDIVIDUALS OPERATION 209 from a database, such as database 170 of FIG. 1, maintained by the user/individuals, a bank, a credit card company, credit reporting agency or bureau, and/or any other financial institution or data source, as discussed herein, and/or available or known at the time of filing, and/or as later developed.

Returning to FIG. 2, in one embodiment, at least part of the financial data associated with the one or more other individuals is obtained at OBTAIN FINANCIAL DATA ASSOCIATED WITH ONE OR MORE OTHER INDIVIDUALS OPERATION 209 by embedding the data in, or on, a computer program product, as discussed herein, and providing the computer program product to the provider of the financial management system associated with process for providing budget recommendations based on financial data from similarly situated individuals 200 and/or process for providing budget recommendations based on financial data from similarly situated individuals 200.

In one embodiment, at least part of the financial data associated with the one or more other individuals is obtained at OBTAIN FINANCIAL DATA ASSOCIATED WITH ONE OR MORE OTHER INDIVIDUALS OPERATION 209 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, stocks, mutual funds, investment accounts, or other financial resources, accounts and/or services used by an individual to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by the given individual to pay for and/or conduct financial transactions.

In one embodiment, at least part of the financial data associated with the one or more other individuals is obtained at OBTAIN FINANCIAL DATA ASSOCIATED WITH ONE OR MORE OTHER INDIVIDUALS OPERATION 209 by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In various embodiments, at least part of: the historical financial transaction data associated with the given individual and/or other financial data associated with the given individual obtained at OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205; and/or data representing the one or more "financial peer" identification criteria/parameters to be used for identifying individuals who are financially similarly situated with respect to the given individual of ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207; and/or the financial data associated with the with the one or more other individuals obtained at OBTAIN FINANCIAL DATA ASSOCIATED WITH ONE OR MORE OTHER INDIVIDUALS OPERATION 209 is stored in whole, or in part, in a data storage means maintained by, accessible by, owned by, or otherwise related to: process for providing budget recommendations based on financial data from similarly situated individuals 200 (FIG. 2), and/or a provider of process for providing budget recommendations based on financial data from similarly situated individuals 200; a financial management system, and/or a provider of a financial management system; a computing system implemented data management system, and/or a provider of a computing system implemented data management system, or any other party, by any one of the numerous mechanisms known to those of skill in the art.

For instance, in one embodiment, the data, in whole, or in part, is stored in a memory system, such as memory systems 103, 143, 153 or server memory system 123, or database 170, of FIG. 1, or in a cache memory, such as cache memories 103A/153A/143A of FIG. 1, or in any main memory or mass memory, associated with a computing system, such as computing systems 100, 140, or 150 described above. In one embodiment, the data, in whole, or in part, is stored in any computing system and/or server system, such as computing systems 100, 140, or 150 or server system 120, or other device, in another location, or on/in a computer readable medium, and/or any other computer program product, as discussed herein. In one embodiment, the data, in whole, or in part, is stored on a webpage, in a web-based system, or on a public network such as the Internet.

Returning to FIG. 2, in some embodiments, the data stored as described above is maintained, in whole, or in part, by: process for providing budget recommendations based on financial data from similarly situated individuals 200, and/or a provider of process for providing budget recommendations based on financial data from similarly situated individuals 200; a financial management system, and/or a provider of a financial management system; a computing system implemented data management system, and/or a provider of a computing system implemented data management system; a third party data storage institution; any third party service or institution; or any other parties. In these embodiments, access to the data is then provided to process for providing budget recommendations based on financial data from similarly situated individuals 200, and/or a financial management system, by providing access to the data and/or providing the data on a computer program product.

In one embodiment, once actual financial data associated with one or more individuals other than the given individual of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 is obtained from one or more sources at OBTAIN FINANCIAL DATA ASSOCIATED WITH ONE OR MORE OTHER INDIVIDUALS OPERATION 209, process flow proceeds to ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211.

In one embodiment, at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 the financial data associated with the other individuals of OBTAIN FINANCIAL DATA ASSOCIATED WITH ONE OR MORE OTHER INDIVIDUALS OPERATION 209 is analyzed using the one or more financial peer identification criteria/parameters of ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 to identify one or more financial peers of the given individual.

In one embodiment, at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 the financial data associated with the other individuals of OBTAIN FINANCIAL DATA ASSOCIATED WITH ONE OR MORE OTHER INDIVIDUALS OPERATION 209 is analyzed using the one or more financial peer identification criteria/parameters of ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 to identify one or more financial peers of the given individual using one or more processors associated with one or more computing systems, such as CPUs 101, 141, 151 and/or processor 121 of FIG. 1.

Returning to FIG. 2, in one embodiment, at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 one or more financial peers of the given individual are identified.

In one embodiment, once the financial data associated with the other individuals of OBTAIN FINANCIAL DATA ASSOCIATED WITH ONE OR MORE OTHER INDIVIDUALS OPERATION 209 is analyzed using the one or more financial peer identification criteria/parameters of ANALYZE THE GIVEN INDIVIDUAL'S HISTORICAL FINANCIAL DATA TO DETERMINE/DEFINE CRITERIA/PARAMETERS FOR IDENTIFYING FINANCIAL PEERS OF THE GIVEN INDIVIDUAL OPERATION 207 to identify one or more financial peers of the given individual, and one or more financial peers of the given individual are identified, at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211, process flow proceeds to ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213.

In one embodiment, at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 is analyzed, aggregated, averaged, and/or otherwise processed.

In one embodiment, at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 is analyzed, aggregated, averaged, and/or otherwise processed, using one or more processors associated with one or more computing systems, such as CPUs 101, 141, 151 and/or processor 121 of FIG. 1.

In one embodiment, the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 analyzed, aggregated, averaged, and/or otherwise processed, at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 includes data indicating one or more budget categories defined/used by the one or more financial peers of the given individual identified.

In one embodiment, the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 analyzed, aggregated, averaged, and/or otherwise processed, at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 includes data indicating amounts budgeted in one or more categories defined/used by the one or more financial peers of the given individual identified.

In one embodiment, the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 analyzed, aggregated, averaged, and/or otherwise processed, at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 includes data indicating actual amounts spent by the one or more financial peers of the given individual identified in one or more budget categories.

As discussed in more detail below, in one embodiment, the analyzed, aggregated, averaged, and/or otherwise processed financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 is then used to provide the given individual, and/or an authorized user, one or more budget recommendations.

In one embodiment, relatively detailed analysis is possible at ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 because, as discussed above, in embodiments using financial management systems, the financial transaction data, payee identification, payee location, payment amount, date of the transaction, item purchased identification data, tags, flags, and other data is often used/created by the financial management system to categorize and/or tag and/or flag individual financial transactions as a particular type of income or expense. In addition, as discussed above, financial management systems typically have access to data from multiple sources, and often all sources, so that a relatively complete set of financial data can be obtained and compared.

In one embodiment, once at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 the financial data associated with the identified one or more financial peers of the given individual identified at ANALYZE THE FINANCIAL DATA ASSOCIATED WITH THE ONE OR MORE OTHER INDIVIDUALS TO IDENTIFY FINANCIAL PEERS OF THE GIVEN INDIVIDUAL USING THE DEFINED CRITERIA/PARAMETERS FOR IDENTIFYING FINANCIAL PEERS OF THE GIVEN INDIVIDUAL OPERATION 211 is analyzed, aggregated, averaged, and/or otherwise processed at ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213, process flow proceeds to PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 is used to provide the given individual of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 one or more budget recommendations.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual is used to provide the given individual who is a new user of a financial management system and/or a budgeting feature a budget template with initial budgetary guidelines, and/or budgetary categories, and/or budgetary amounts for one or more budget categories, based, at least in part, on the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual is used to automatically provide the given individual a budget template with initial budgetary guidelines, and/or budgetary categories, and/or budgetary amounts for one or more budget categories, based, at least in part, on the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual is used to semi-automatically, with user approval, provide the given individual a budget template with initial budgetary guidelines, and/or budgetary categories, and/or budgetary amounts for one or more budget categories, based, at least in part, on the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual is used to provide the given individual a budget template with initial budgetary guidelines, and/or budgetary categories, and/or budgetary amounts for one or more budget categories, based, at least in part, on the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 upon user request/activation.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the financial data associated with the identified one or more financial peers of the given individual is used to provide the user/given individual a comparison of the given individual's budget/spending data with the aggregated, averaged, and/or otherwise processed budget/spending data for the identified one or more financial peers of the given individual.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided one or more graphical displays and/or data displays showing the recommended budget template and/or a comparison between the aggregated, averaged, and/or otherwise processed budget/spending data for the identified one or more financial peers of the given individual and the financial transaction data, and/or budgeting data, associated with given individual in the form of any symbol or graphical display capable of visually showing the recommended budget template and/or a comparison between the aggregated, averaged, and/or otherwise processed budget/spending data for the identified one or more financial peers of the given individual and the financial transaction data, and/or budgeting data, associated with given individual.

As an example, a thermometer, a sliding scale, any graphical representation, or any partially filled figure or symbol, or outline thereof, may be used. Moreover, these symbols, graphical displays, and scales may, in various embodiments, display one or more of: the aggregated, averaged, and/or otherwise processed budget/spending data for the identified one or more financial peers of the given individual; the financial transaction data, and/or budgeting data, associated with given individual; and/or differential between the aggregated, averaged, and/or otherwise processed budget/spending data for the identified one or more financial peers of the given individual and the financial transaction data, and/or budgeting data, associated with given individual.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual in the form of a summary report.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual as a display displayed on any display device accessible by the individual, such as display device 115, 165, 189 and/or 125 of FIG. 1 and/or any display device discussed herein, and/or known in the art at the time of filing, and/or as developed after the time of filing. In one embodiment, the display device is associated with any computing system, such as computing systems 100, 140, 150 and/or server system 120 of FIG. 1, and/or as discussed herein, and/or known in the art at the time of filing, and/or as developed after the time of filing.

Returning to FIG. 2, in one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by providing the individual, or any authorized user, access to one or more websites.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by giving the individual, or any authorized user, access to any database, such as database 130 of FIG. 1, computing system, such as computing systems 100, 140 and/or 150 of FIG. 1, and/or a server system, such as server system 120 of FIG. 1, or any web-site or other web-based system, associated with process for providing budget recommendations based on financial data from similarly situated individuals 200.

Returning to FIG. 2, in one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual using a computer program product as discussed herein.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a financial management system, such as financial management systems 180, 185, 190, 126 of FIG. 1, that is a parent system for, implements, and/or is otherwise associated with, process for providing budget recommendations based on financial data from similarly situated individuals 200.

Returning to FIG. 2, in one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a computing system implemented data management system that is a parent system for, implements, and/or is otherwise associated with, process for providing budget recommendations based on financial data from similarly situated individuals 200.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the user/the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through any network, such as network 130 of FIG. 1, of computing systems, such as computing systems 100, 140 and 150 of FIG. 1, and/or server systems, such as server system 120 of FIG. 1, that is comprised of multiple different computers, wireless devices, cellular telephones, digital telephones, two-way pagers, personal digital assistants, server computers, or any desired combination of these devices, that are interconnected using a network as discussed herein, and/or known in the art at the time of filing, and/or as developed after the time of filing.

Returning to FIG. 2, in one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 user/the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through e-mail or through text messaging.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 is provided data representing the recommended budget template and/or a comparison between the aggregated, averaged, and/or otherwise processed budget/spending data for the identified one or more financial peers of the given individual and the financial transaction data, and/or budgeting data, associated with given individual using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 the given individual is also provided access to data representing advice regarding any recommended changes and/or allocation of funds the individual might wish to make in order to better align the individual's own financial position/budget with the average financial position/budget of the identified similarly situated individuals.

In one embodiment, at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215 once the given individual implements the budgeting feature and creates their own budget, the budgeting data and/or financial data associated with the given individual is provided to process for providing budget recommendations based on financial data from similarly situated individuals 200 as feedback and/or for use with future budget recommendations.

In one embodiment, once the financial data associated with the identified one or more financial peers of the given individual of ANALYZE, AGGREGATE, AND/OR OTHERWISE PROCESS, THE FINANCIAL DATA ASSOCIATED WITH THE IDENTIFIED SIMILARLY SITUATED INDIVIDUALS OPERATION 213 is used to provide the given individual of OBTAIN HISTORICAL FINANCIAL TRANSACTION DATA ASSOCIATED WITH A GIVEN INDIVIDUAL THROUGH THE FINANCIAL MANAGEMENT SYSTEM OPERATION 205 one or more budget recommendations at PROVIDE THE GIVEN INDIVIDUAL WITH ONE OR MORE BUDGETING RECOMMENDATIONS BASED ON THE ANALYSIS, AGGREGATION, AND/OR OTHER PROCESSING, OF THE FINANCIAL DATA ASSOCIATED WITH THE IDENTIFIED SIMILARLY SITUATED INDIVIDUALS OPERATION 215, process flow proceeds to EXIT OPERATION 230. In one embodiment, at EXIT OPERATION 230, process for providing budget recommendations based on financial data from similarly situated individuals 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing budget recommendations based on financial data from similarly situated individuals 200, an individual's actual financial transaction data is used to identify financial peers of the individual. Then, using process for providing budget recommendations based on financial data from similarly situated individuals 200, the aggregated, averaged, and/or otherwise processed, budget/spending data for the identified financial peers of the given individual is used to provide the individual with an initial budget template and/or guidelines, and/or a comparison between the aggregated, averaged, and/or otherwise processed budget/spending data for the identified one or more financial peers of the given individual and the financial transaction data, and/or budgeting data, associated with given individual.

Consequently, using process for providing budget recommendations based on financial data from similarly situated individuals 200, not only are individuals spared the need to expend time and energy entering large amounts of budgeting data required to initiate currently available budgeting features, but they can immediately benefit from the comparative analysis and the "wisdom of the masses" that has become available with the advent of the Internet, improved processing power, and improved data storage. As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "monitoring", "updating", "associating", "analyzing", "defining", "storing", "saving", "displaying", "implementing", "performing", "creating", "assigning", "estimating", "entering", "modifying", "categorizing", "providing", "processing", "accessing", "selecting", "creating", "using", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing budget recommendations based on financial data from similarly situated individuals comprising:
   one or more processors configured to:
      provide a financial management system, the financial management system being implemented by one or more processors associated with one or more computing systems;
      obtain a first individual's financial data from the financial management system, the first individual's financial data including data representing historical financial transactions associated with the first individual, the historical financial transactions representing income received from one or more payors, and expense transactions representing spending at one or more merchants;
      determine one or more parameters for identifying financial peers of the first individual, by analyzing the first individual's financial transaction data;
      obtain one or more other individuals' financial transaction data, the one or more other individuals being individuals other than the first individual, the one or more other individuals' financial transaction data being associated with the one or more other individuals, the one or more other individuals' financial transaction data representing income received from one or more payors, and expense transactions relating to spending at one or more merchants;
      identify one or more of the one or more other individuals that are financial peers of the first individual based, at least in part, on the one or more parameters for identifying financial peers of the first individual, the identifying being accomplished by analyzing the one or more other individuals' financial transaction data;
      identify one or more of the one or more other individuals as financial peers of the first individual, based on the analysis of the other individuals' financial transaction data and the other individuals' financial transaction data meeting the one or more parameters;
      process the financial transaction data associated with the identified one or more financial peers of the first individual; and
      provide data representing one or more budget guidelines for the first individual based, at least in part, on the processed financial transaction data associated with the identified one or more financial peers of the first individual including providing data representing a comparison between averaged budget spending data for the identified one or more financial peers of the given individual and the financial transaction data associated with the first individual.

2. The computing system implemented process for providing budget recommendations based on financial data from similarly situated individuals of claim 1, wherein;
   the financial management system is a financial management system selected from the group of financial management systems consisting of:
   an on-line, or web-based, or computing system implemented personal financial management system, package, program, module, or application;

an on-line, or web-based, or computing system implemented personal accounting system, package, program, module, or application;

an on-line, or web-based, or computing system implemented personal or home business inventory system, package, program, module, or application;

an on-line, or web-based, or computing system implemented healthcare expense tracking system, package, program, module, or application;

an on-line, or web-based, or computing system implemented tax preparation system, package, program, module, or application;

an on-line, or web-based, or computing system implemented personal asset management system, package, program, module, or application an on-line, or web-based, or computing system implemented business accounting system, package, program, module, or application;

an on-line, or web-based, or computing system implemented business financial management system, package, program, module, or application;

an on-line, or web-based, or computing system implemented business inventory system, package, program, module, or application;

an on-line, or web-based, or computing system implemented business asset management system, package, program, module, or application; and an on-line, or web-based, or computing system implemented Point-Of-Sale (POS) system, package, program, module, or application.

3. The computing system implemented process for providing budget recommendations based on financial data from similarly situated individuals of claim 1, wherein;
in addition to the data representing historical financial transactions, the first individual's financial data includes financial data selected from the group of financial data consisting of:
the first individual's existing budget categories;
the first individual's spending in one or more budget categories;
the first individual's age;
the first individual's area of residence;
the first individual's marital status;
the first individual's dependents;
the first individual's occupation;
the first individual's income;
the first individual's household income;
the first individual's average contributions to saving accounts or programs over a given time;
the first individual's savings account balances;
the first individual's average contributions to retirement accounts or programs over a given time;
the first individual's balances in retirement accounts or programs;
the first individual's average balances in checking;
the first individual's mortgage/rent payments;
the first individual's equity in real estate;
the first individual's stocks and other holdings;
the first individual's healthcare expenses; and
the first individual's spending in defined categories or with specific merchants.

4. The computing system implemented process for providing budget recommendations based on financial data from similarly situated individuals of claim 1, wherein;
at least one of the one or more parameters for identifying financial peers of the first individual is selected from the group of one or more parameters for identifying financial peers of the first individual consisting of:
an income range;
an expenses range;
an area of residence;
home ownership status;
marital status;
existence of dependents; and
number of dependents.

5. The computing system implemented process for providing budget recommendations based on financial data from similarly situated individuals of claim 1, wherein;
the process is configured to determine the following one or more parameters from the financial transaction data of the first individual:
an age range;
occupation;
a range of average contributions to saving accounts or programs over a given time;
a range of savings account balances;
a range of average contributions to retirement accounts or programs over a given time;
a range of balances in retirement accounts or programs;
a range of average balances in checking;
a range of mortgage/rent payments;
a range of equity in real estate;
a range of stocks and other holdings;
a range of healthcare expenses; and
a range of spending in defined categories or with specific merchants.

6. The computing system implemented process for providing budget recommendations based on financial data from similarly situated individuals of claim 1, wherein;
the one or more other individuals' financial data is obtained from one or more financial management systems.

7. The computing system implemented process for providing budget recommendations based on financial data from similarly situated individuals of claim 1, wherein;
the one or more other individuals' financial data includes financial data selected from the group of financial data consisting of:
one or more budget categories used by the one or more other individuals;
amount budgeted in one or more budget categories used by the one or more other individuals;
amounts actually spent in one or more budget categories used by the one or more other individuals;
historical financial transaction data associated with the one or more other individuals;
the other individuals' age;
the other individuals' area of residence;
the other individuals' marital status;
the other individuals' dependents;
the other individuals' occupation;
the other individuals' income;
the other individuals' household income;
the other individuals' average contributions to saving accounts or programs over a given time;
the other individuals' savings account balances;
the other individuals' average contributions to retirement accounts or programs over a given time;
the other individuals' balances in retirement accounts or programs;
the other individuals' average balances in checking;
the other individuals' mortgage/rent payments;
the other individuals' equity in real estate;
the other individuals' stocks and other holdings;

the other individuals' healthcare expenses; and the other individuals' spending in defined categories or with specific merchants.

8. The computing system implemented process for providing budget recommendations based on financial data from similarly situated individuals of claim 1, wherein;

providing data representing one or more budget guidelines for the first individual based, at least in part, on the processed financial data associated with the identified one or more financial peers of the first individual includes providing data representing a budget template.

9. The computing system implemented process for providing budget recommendations based on financial data from similarly situated individuals of claim 1, wherein;

providing data representing one or more budget guidelines for the first individual based, at least in part, on the processed financial data associated with the identified one or more financial peers of the first individual includes providing data representing a budget template with initial budgetary categories and budgetary amounts for one or more budget categories.

10. A system for providing budget recommendations based on financial data from similarly situated individuals comprising:

a financial management system, the financial management system being implemented by one or more processors associated with one or more computing systems;

a computing system; and at least one processor associated with the computing system for executing at least part of a process for providing budget recommendations based on financial transaction data from similarly situated individuals, the process for providing budget recommendations based on financial transaction data from similarly situated individuals comprising:

obtaining a first individual's financial transaction data from the financial management system, the first individual's financial transaction data including data representing historical financial transactions associated with the first individual using the at least one processor associated with the computing system, the historical financial transactions representing income received from one or more payors, and expense transactions representing spending at one or more merchants;

determining one or more parameters for identifying financial peers of the first individual, by analyzing the first individual's financial transaction data;

obtaining one or more other individuals' financial transaction data, the one or more other individuals being individuals other than the first individual, the one or more other individuals' financial transaction data being associated with the one or more other individuals, the one or more other individuals' financial transaction data representing income received from one or more payors, and expense transactions relating to spending at one or more merchants;

identifying one or more of the one or more other individuals that are financial peers of the first individual based, at least in part, on the one or more parameters for identifying financial peers of the first individual, the identifying being accomplished by analyzing the one or more other individuals' financial transaction data;

identifying one or more of the one or more other individuals as financial peers of the first individual based on the analysis of the other individuals' financial transaction data and the other individuals' financial transaction data meeting the one or more parameters;

processing the financial transaction data associated with the identified one or more financial peers of the first individual; and providing data representing one or more budget guidelines for the first individual based, at least in part, on the processed financial transaction data associated with the identified one or more financial peers of the first individual including providing data representing a comparison between averaged budget spending data for the identified one or more financial peers of the given individual and the financial transaction data associated with the first individual.

11. The system for providing budget recommendations based on financial data from similarly situated individuals of claim 10, wherein;

the financial management system is a financial management system selected from the group of financial management systems consisting of:

an on-line, or web-based, or computing system implemented personal financial management system, package, program, module, or application;

an on-line, or web-based, or computing system implemented personal accounting system, package, program, module, or application;

an on-line, or web-based, or computing system implemented personal or home business inventory system, package, program, module, or application;

an on-line, or web-based, or computing system implemented healthcare expense tracking system, package, program, module, or application;

an on-line, or web-based, or computing system implemented tax preparation system, package, program, module, or application;

an on-line, or web-based, or computing system implemented personal asset management system, package, program, module, or application an on-line, or web-based, or computing system implemented business accounting system, package, program, module, or application;

an on-line, or web-based, or computing system implemented business financial management system, package, program, module, or application;

an on-line, or web-based, or computing system implemented business inventory system, package, program, module, or application;

an on-line, or web-based, or computing system implemented business asset management system, package, program, module, or application; and an on-line, or web-based, or computing system implemented Point-Of-Sale (POS) system, package, program, module, or application.

12. The system for providing budget recommendations based on financial data from similarly situated individuals of claim 10, wherein;

in addition to the data representing historical financial transactions, the first individual's financial data includes financial data selected from the group of financial data consisting of:

the first individual's existing budget categories;

the first individual's spending in one or more budget categories;

the first individual's age;

the first individual's area of residence;

the first individual's marital status;

the first individual's dependents;

the first individual's occupation;

the first individual's income;

the first individual's household income;
the first individual's average contributions to saving accounts or programs over a given time;
the first individual's savings account balances;
the first individual's average contributions to retirement accounts or programs over a given time;
the first individual's balances in retirement accounts or programs;
the first individual's average balances in checking;
the first individual's mortgage/rent payments;
the first individual's equity in real estate;
the first individual's stocks and other holdings;
the first individual's healthcare expenses; and
the first individual's spending in defined categories or with specific merchants.

13. The system for providing budget recommendations based on financial data from similarly situated individuals of claim 10, wherein;
at least one of the one or more parameters for identifying financial peers of the first individual is selected from the group of one or more parameters for identifying financial peers of the first individual consisting of:
an income range;
an expenses range;
an area of residence;
home ownership status;
marital status;
existence of dependents; and
number of dependents.

14. The system for providing budget recommendations based on financial data from similarly situated individuals of claim 10, wherein;
the process is configured to determine the following one or more parameters from the financial transaction data of the first individual:
an age range;
occupation;
a range of average contributions to saving accounts or programs over a given time;
a range of savings account balances;
a range of average contributions to retirement accounts or programs over a given time;
a range of balances in retirement accounts or programs;
a range of average balances in checking;
a range of mortgage/rent payments;
a range of equity in real estate;
a range of stocks and other holdings;
a range of healthcare expenses; and
a range of spending in defined categories or with specific merchants.

15. The system for providing budget recommendations based on financial data from similarly situated individuals of claim 10, wherein;
the one or more other individuals' financial data is obtained from one or more financial management systems.

16. The system for providing budget recommendations based on financial data from similarly situated individuals of claim 10, wherein;
the one or more other individuals' financial data includes financial data selected from the group of financial data consisting of:
one or more budget categories used by the one or more other individuals;
amount budgeted in one or more budget categories used by the one or more other individuals;
amounts actually spent in one or more budget categories used by the one or more other individuals;
historical financial transaction data associated with the one or more other individuals;
the other individuals' age;
the other individuals' area of residence;
the other individuals' marital status;
the other individuals' dependents;
the other individuals' occupation;
the other individuals' income;
the other individuals' household income;
the other individuals' average contributions to saving accounts or programs over a given time;
the other individuals' savings account balances;
the other individuals' average contributions to retirement accounts or programs over a given time;
the other individuals' balances in retirement accounts or programs;
the other individuals' average balances in checking;
the other individuals' mortgage/rent payments;
the other individuals' equity in real estate;
the other individuals' stocks and other holdings;
the other individuals' healthcare expenses; and
the other individuals' spending in defined categories or with specific merchants.

17. The system for providing budget recommendations based on financial data from similarly situated individuals of claim 10, wherein;
providing data representing one or more budget guidelines for the first individual based, at least in part, on the processed financial data associated with the identified one or more financial peers of the first individual includes providing data representing a budget template.

18. The system for providing budget recommendations based on financial data from similarly situated individuals of claim 10, wherein;
providing data representing one or more budget guidelines for the first individual based, at least in part, on the processed financial data associated with the identified one or more financial peers of the first individual includes providing data representing a budget template with initial budgetary categories and budgetary amounts for one or more budget categories.

19. A method for providing budget recommendations based on financial data from similarly situated individuals comprising:
providing a financial management system, the financial management system being implemented by one or more processors associated with one or more computing systems;
obtaining a first individual's financial data from the financial management system, the first individual's financial data including data representing historical financial transactions associated with the first individual, the historical financial transactions representing income received from one or more payors, and expense transactions representing spending at one or more merchants;
determining one or more parameters for identifying financial peers of the first individual, by analyzing the first individual's financial transaction data;
obtaining one or more other individuals' financial transaction data, the one or more other individuals being individuals other than the first individual, the one or more other individuals' financial transaction data being associated with the one or more other individuals, the one or more other individuals' financial transaction data representing income received from one or more payors, and expense transactions relating to spending at one or more merchants;

identifying one or more of the one or more other individuals that are financial peers of the first individual based, at least in part, on the one or more parameters for identifying financial peers of the first individual, the identifying being accomplished by analyzing the one or more other individuals' financial transaction data;

identifying one or more of the one or more other individuals as financial peers of the first individual based on the analysis of the other individuals' financial transaction data and the other individuals' financial transaction data meeting the one or more parameters;

transforming a status of the one or more of the one or more other individuals' identified as financial peers of the first individual to the status of financial peers of the first individual;

processing the financial transaction data associated with the identified one or more financial peers of the first individual; and providing data representing one or more budget guidelines for the first individual based, at least in part, on the processed financial transaction data associated with the identified one or more financial peers of the first individual including providing data representing a comparison between averaged budget spending data for the identified one or more financial peers of the given individual and the financial transaction data associated with the first individual.

20. The method for providing budget recommendations based on financial data from similarly situated individuals of claim 19, wherein;

the process is configured to determine the following one or more parameters from the financial transaction data of the first individual:
an income range;
an expenses range;
an area of residence;
home ownership status;
marital status;
existence of dependents; and
number of dependents.

21. The method for providing budget recommendations based on financial data from similarly situated individuals of claim 19, wherein;
the one or more other individuals' financial data is obtained from one or more financial management systems.

22. The method for providing budget recommendations based on financial data from similarly situated individuals of claim 19, wherein;
the one or more other individuals' financial data includes financial data selected from the group of financial data consisting of:

one or more budget categories used by the one or more other individuals;
amount budgeted in one or more budget categories used by the one or more other individuals;
amounts actually spent in one or more budget categories used by the one or more other individuals;
historical financial transaction data associated with the one or more other individuals;
the other individuals' age;
the other individuals' area of residence;
the other individuals' marital status;
the other individuals' dependents;
the other individuals' occupation;
the other individuals' income;
the other individuals' household income;
the other individuals' average contributions to saving accounts or programs over a given time;
the other individuals' savings account balances;
the other individuals' average contributions to retirement accounts or programs over a given time;
the other individuals' balances in retirement accounts or programs;
the other individuals' average balances in checking;
the other individuals' mortgage/rent payments;
the other individuals' equity in real estate;
the other individuals' stocks and other holdings;
the other individuals' healthcare expenses; and
the other individuals' spending in defined categories or with specific merchants.

23. The method for providing budget recommendations based on financial data from similarly situated individuals of claim 19, wherein;
providing data representing one or more budget guidelines for the first individual based, at least in part, on the processed financial data associated with the identified one or more financial peers of the first individual includes providing data representing a budget template.

24. The method for providing budget recommendations based on financial data from similarly situated individuals of claim 19, wherein;
providing data representing one or more budget guidelines for the first individual based, at least in part, on the processed financial data associated with the identified one or more financial peers of the first individual includes providing data representing a comparison between averaged budget spending data for the identified one or more financial peers of the given individual and the financial transaction data associated with first individual.

* * * * *